(12) United States Patent
Li (10) Patent No.: US 8,301,787 B2
(45) Date of Patent: Oct. 30, 2012

(54) SELECTIVE USE OF ANONYMOUS PROXIES

(75) Inventor: Richard Ding Li, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 400 days.

(21) Appl. No.: 11/728,103

(22) Filed: Mar. 22, 2007

(65) Prior Publication Data

US 2008/0235385 A1   Sep. 25, 2008

(51) Int. Cl.
*G06F 15/16* (2006.01)
(52) U.S. Cl. .................. 709/229; 709/217; 709/219
(58) Field of Classification Search .............. 709/217, 709/719, 229, 238, 245
See application file for complete search history.

(56) References Cited

U.S. PATENT DOCUMENTS

| | | | | |
|---|---|---|---|---|
| 5,961,593 | A  * | 10/1999 | Gabber et al. | 709/219 |
| 6,366,912 | B1   | 4/2002  | Wallent | |
| 7,401,115 | B1 * | 7/2008  | Arsenault | 709/203 |
| 2001/0034709 | A1 * | 10/2001 | Stoifo et al. | 705/51 |
| 2002/0128925 | A1 * | 9/2002  | Angeles | 705/26 |
| 2003/0208570 | A1 * | 11/2003 | Lapidous | 709/222 |
| 2004/0002903 | A1 * | 1/2004  | Stolfo et al. | 705/26 |
| 2005/0273849 | A1 * | 12/2005 | Araujo et al. | 726/12 |
| 2006/0015722 | A1 * | 1/2006  | Rowan et al. | 713/166 |
| 2007/0099634 | A1 * | 5/2007  | Chari et al. | 455/456.3 |
| 2008/0005264 | A1 * | 1/2008  | Brunell et al. | 709/217 |

OTHER PUBLICATIONS

Red Hat, Inc. Office Action for U.S. Appl. No. 11/728,023 mailed Mar. 11, 2010.
Red Hat, Inc. Office Action for U.S. Appl. No. 11/728,023 mailed Mar. 18, 2010.
Red Hat, Inc. Office Action for U.S. Appl. No. 11/728,023 mailed Aug. 3, 2010.
U.S. Appl. No. 11/728,023, Office Action dated Nov. 18, 2010, 12 pages.
U.S. Appl. No. 11/728,023, Advisory Action dated Oct. 13, 2010, 3 pages.
Red Hat, Inc. Office Action for 11/728,023 mailed Apr. 19, 2011.
Red Hat, Inc. Office Action for 11/728,023 mailed Nov. 14, 2011.

* cited by examiner

*Primary Examiner* — Imad Hussain
(74) *Attorney, Agent, or Firm* — Lowenstein Sandler PC (57) ABSTRACT

A method and apparatus for selectively using an anonymous proxy. A user request for content is received. A determination is made as to whether the user request satisfies context criteria. When the user request satisfies the context criteria, the user request is forwarded to an anonymous proxy. When the user request does not satisfy the context criteria, the request is sent directly to a content provider.

21 Claims, 5 Drawing Sheets

SELECTIVE USE OF ANONYMOUS PROXIES

TECHNICAL FIELD

Embodiments of the present invention relate to browsers, and more specifically to web browsers that selectively use anonymous proxies.

BACKGROUND

Web browsers are an integral part of the internet. Web browsers access information from web servers, and present the information to users in a convenient, easily understood manner.

Web browsers receive web pages by sending requests for content to servers that host the web pages. The requests for content often include user identifying information such as cookies, IP addresses, referrer headers, etc. Servers may collect this user identifying information and maintain profiles on users who access their web pages. However, this user identifying information is not always necessary to request content from servers.

Most modern browsers support cookies, and allow a user to specify a security setting that affects how the browser uses cookies. At a low security setting, all cookies are accepted. At a medium security setting, a user may be prompted to accept or deny each cookie. At a high security setting all cookies are denied. A browser may also allow a user to choose to reject cookies from specific domains, disallow third-party cookies, and/or delete all cookies when the browser is closed. These cookie management techniques may inadvertently disable desirable web site functions. For example, a security setting that blocks all cookies from the domain google.com would prevent cookies associated with searches made by Google® from being transmitted, but would also interfere with the use of Gmail® (Google's® internet mail service).

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for selectively using an anonymous proxy. In one embodiment, in response to a user request for content, a determination is made as to whether the user request satisfies context criteria. The context criteria may be, for example, characteristics of a server, or conditions under which user identifying information is received. When the user request satisfies the context criteria, the user request is forwarded to an anonymous proxy. When the user request does not satisfy the context criteria, the request is sent directly to a content provider.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable storage medium includes any mechanism for storing or transmitting information in a form readable by a machine (e.g., a computer). For example, a machine-readable storage medium includes read only memory ("ROM"), random access memory ("RAM"), magnetic disk storage media, optical storage media, flash memory devices, etc.

Figure 1:
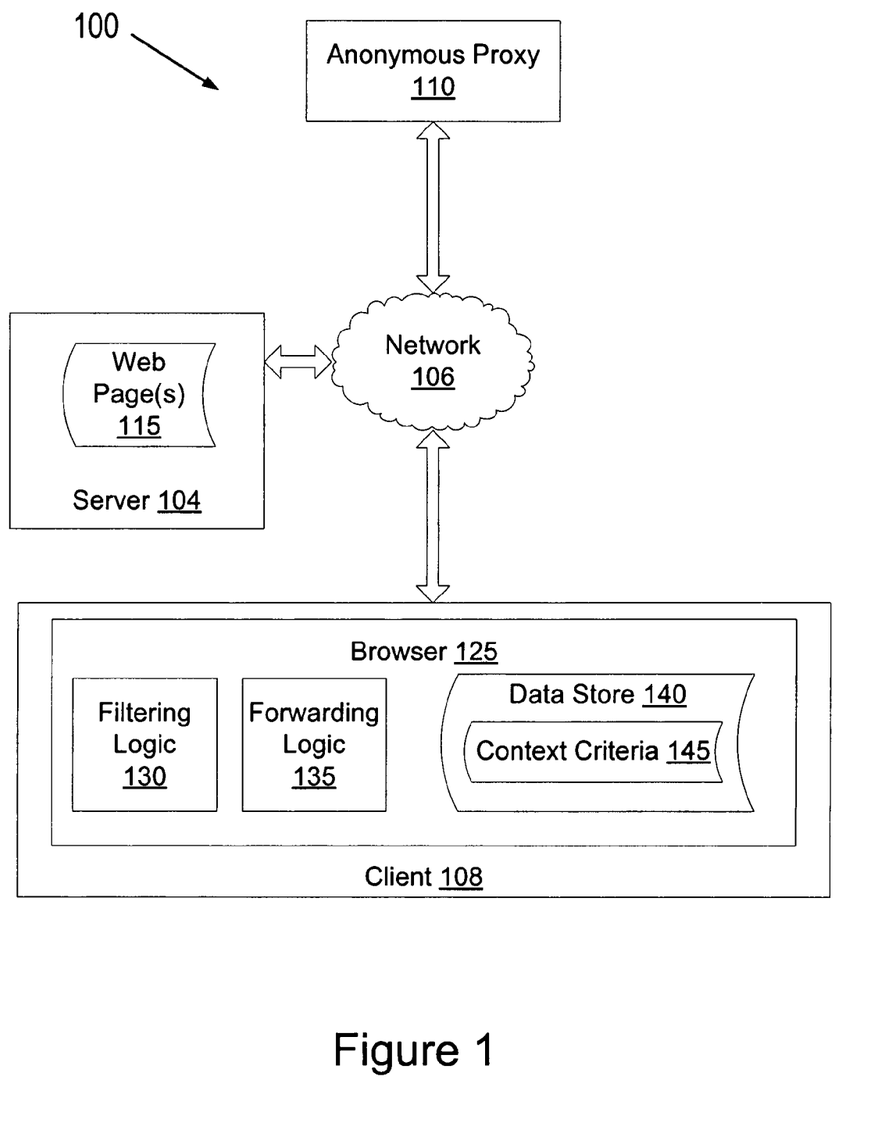
FIG. 1 illustrates an exemplary network architecture, in which embodiments of the present invention may operate.

FIG. 1 illustrates an exemplary network architecture 100, in which embodiments of the present invention may operate. The network architecture 100 may include a client device (client) 108, a server 104, an anonymous proxy 110 and a network 106. The client 108, the server 104 and the anonymous proxy 110 are coupled to the network 106, which may be a public network (e.g., Internet) or a private network (e.g., Ethernet or a local area Network (LAN)).

In one embodiment, the server 104 is a web server that provides text, images and other information in the form of one or more web pages 115. The server 104 may accept user requests for content (e.g., hyper text transfer protocol (HTTP) requests) from client 108, and reply by sending responses (e.g., HTTP responses), which may include information pertaining to web pages 115.

The client 108 may be, for example, a personal computer (PC), mobile phone, palm-sized computing device, personal digital assistant (PDA), etc. The client 108 may include a browser 125. The browser 125 is an application that enables the client 108 to display and interact with text, images, and other information provided by the server 104. In one embodiment, the browser 125 is a web browser configured to display web pages 115.

Browser 125 may receive user requests for content and send the requests to server 104. In one embodiment, a user request for content is sent to the server 104 to access one or more web pages 115. User requests for content may also be sent to the server 104 to initiate some function. For example, a user request for content may be sent to the server 104 to initiate a search function, to obtain yellowpage information, etc.

Whenever a user request for content is sent to the server 104, that request may include user identifying information. User identifying information is information that can be used to track user browsing behavior, to determine user preferences, and possibly, to ultimately identify a user. Examples of user identifying information include an IP address, cookies, etc.

In one embodiment, the browser 125 includes a filtering logic 130 and a data store 140. The filtering logic 130, when enabled, may filter out the user identifying information from user requests for content. In one embodiment, the filtering logic 130 determines whether to filter out user identifying information based on context criteria 145.

Context criteria 145 are a set of conditions that, when satisfied, may cause the filtering logic 130 to generate a specific result. In one embodiment, context criteria 145 include certain characteristics of server 104 to which a user request for content will be sent, and the type of content requested from the server 104. Alternatively, context criteria 145 may include conditions under which user identifying information is received by the client, conditions under which a current user request for content is received, and/or the type of the user identifying information and the user request for content. Context criteria are described in more detail below with reference to FIGS. 4A and 4B.

In one embodiment, context criteria 145 are stored in data store 140. Alternatively, context criteria may be stored elsewhere on client 108, or on an external server such as the anonymous proxy 110, or be hard coded as part of the filtering logic 130.

In one embodiment, the filtering logic 130 determines a current context for a user request for content. For example, the filtering logic 130 may determine whether the server 104 corresponds to a specific website type, has a specific trustworthiness rating, whether the user identifying information was received under specific circumstances, etc. If the current context satisfies context criteria 145, the filtering logic 130 filters out some or all user identifying information from the user request.

In one embodiment, a determination of what user identifying information should be filtered out, if any, is based on a user profile or user preferences. User preferences may include, for example, browsing preferences, search preferences, commerce preferences, etc. Default user preferences may be provided by the browser 125 if no user preferences have been selected. The user profile may include user preferences, as well as additional user information, such as a user age. In one embodiment, if the user is below a specific age, additional context criteria apply.

In one embodiment, a user may explicitly select the circumstances under which to filter out each type of user identifying information. Alternatively, a user may select a privacy setting from multiple privacy settings, each applying different context criteria under different circumstances.

User identifying information may be fully filtered or only partially filtered. For example, when user identifying information is partially filtered, cookies and a referrer header may be filtered out, but an IP address may not be filtered. Some user identifying information can be filtered out simply by not sending the information (e.g., cookies and referrer headers).

In one embodiment, the anonymous proxy 110 is used to filter out user identifying information (e.g., a client IP address, cookies, etc.). When no filtering is being performed, a user request for content is generally sent directly to server 104. However, by directly sending a request for content to server 104, the browser 125 identifies an IP address of the client 108 to the server 104. This identification may be prevented by using the proxy server 110. Other forms of user identifying information may also be filtered out from a user request for content by the proxy server 110.

In one embodiment, browser 125 establishes a secure connection with anonymous proxy 110 before the user request for content is forwarded thereto. Data (e.g., user identifying information) that is then transferred between the anonymous proxy 110 and client 108 may not be accessible to third parties even if it is intercepted.

In one embodiment, the anonymous proxy 110 is a proxy server that acts as an intermediate destination to which the user request for content may be forwarded. Alternatively, the anonymous proxy 110 may be a distributed proxy service that includes multiple proxy servers. The user request for content may be forwarded among the multiple proxy servers before being sent to server 104 to reduce the likelihood of the user request being traced to client 108.

The anonymous proxy 110 may receive the user request for content, and forward it to the ultimate destination, in this case server 104. Responses are then received by the anonymous proxy 110 from the server 104, and forwarded to the client 108. Thereby, server 104 is only informed of the IP address of the anonymous proxy 110, and not of the client 108.

In one embodiment, the anonymous proxy 110 is an anonymous search proxy. The anonymous search proxy may be a specialized anonymous proxy 110 that receives user requests with search queries, and forwards those requests to one or more search sites. The anonymous search proxy may also intercept cookies that are associated with search functions, and store those cookies. Thereby, searches (including those performed by the client 108 and/or those performed by other clients) may all correlate to the anonymous proxy 110 and not to the client 108.

In one embodiment, the browser 125 includes a forwarding logic 135. The forwarding logic 135 forwards user requests for content to the anonymous proxy 110 when directed to do so by the filtering logic 130. For example, the forwarding logic 135 may forward user requests for content to the anonymous proxy 110 when the filtering logic 130 has determined that an IP address of the client 108 should be filtered out. In one embodiment, the anonymous proxy 110 is an anonymous search proxy, and the forwarding logic 135 forwards all user requests for content that are associated with a search query to the anonymous proxy 110.

In one embodiment, the above described features are natively present in the browser 125. In alternative embodiments, one or more of the above features are provided by adding one or more plugins and/or extensions to the browser 125.

Figure 2:
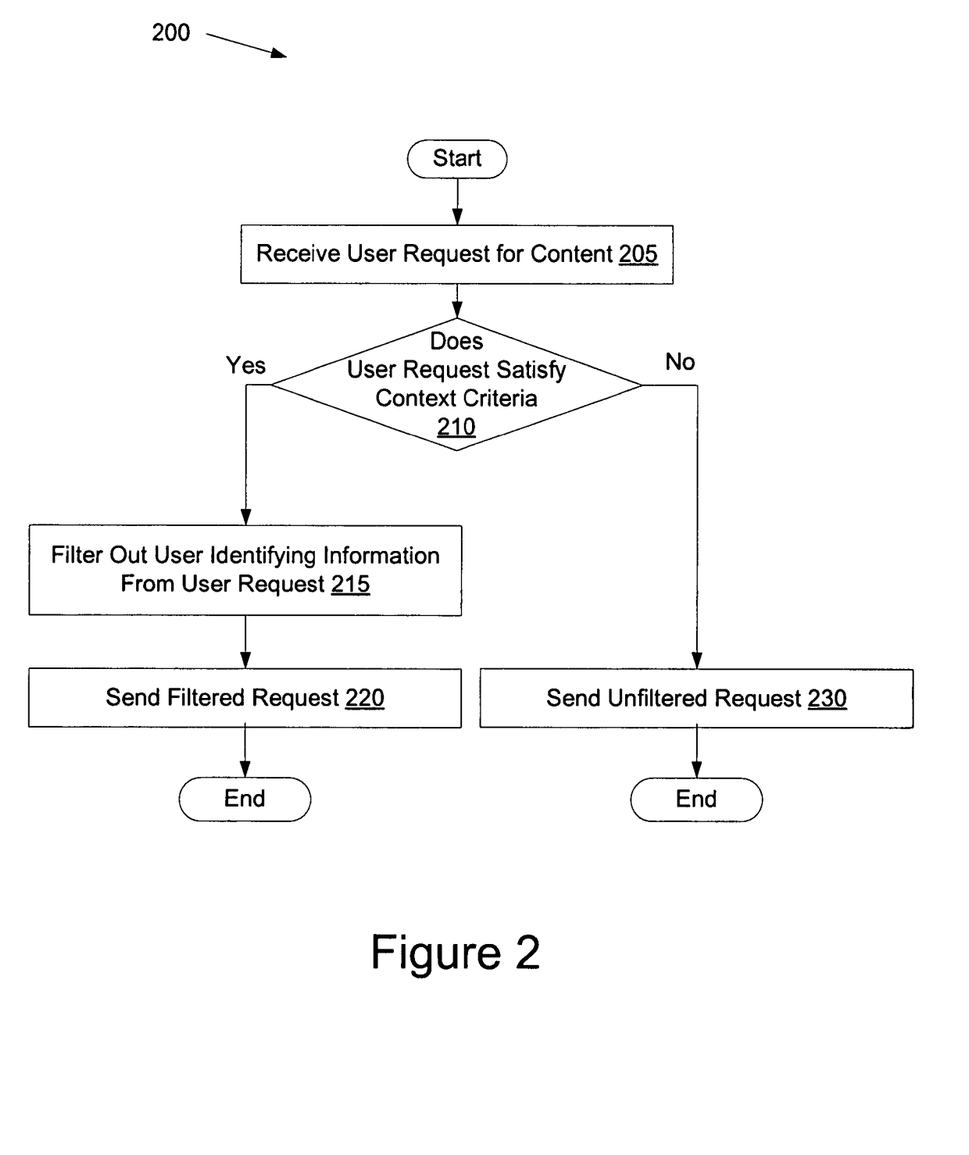
FIG. 2 illustrates a flow diagram of one embodiment for a method of filtering out user identifying information.

FIG. 2 illustrates a flow diagram of one embodiment for a method 200 of filtering out user identifying information. The method may be performed by processing logic that may comprise hardware (e.g., circuitry, dedicated logic, programmable logic, microcode, etc.), software (such as instructions run on a processing device), or a combination thereof. In one embodiment, method 200 is performed by the browser 125 of FIG. 1.

Referring to FIG. 2, method 200 begins with processing logic receiving a user request for content (block 205). In one embodiment, a user request for content is a request to access a destination website. A request for content may also be a request for content other than web pages, such as a request for executable files, images, etc. Alternatively, a user request for content may be a request for a destination server to perform a function and return a result of the function. For example, a user request for content may be a request to perform a search, and to return a search result.

User requests for content may include user identifying information. User identifying information is information that can be used to track user browsing behavior, to determine user preferences, and possibly, to ultimately identify a user.

Multiple types of user identifying information may be included in a request for content. A first type of user identifying information that may be included in a user request for content is an IP address. The IP address identifies a client on which the user operates as the source of the user request for content. Therefore, when the user request for content is sent to a server, that server knows where to send a response.

Another type of user identifying information that may be included in a user request for content is a referrer header. The referrer header specifies an address (e.g., uniform resource locator (URL), universal resource name (URN), etc.) of a document, web page, website, and/or server that directed a user request for content to be sent to a particular destination. The referrer header, when sent to that destination, allows the destination to identify the referring source.

Yet another type of user identifying information that may be included in a user request for content is a cookie (also known as a web cookie and an HTTP cookie). A cookie may be received each time a response to a user request for content is received from a server. This cookie may then be stored, and included in subsequent user requests for content sent to the originating server. Cookies included in a user request for content may be returned to the originating server unchanged.

One or more cookies may be stored on the client, each of which may contain different information and be used for a different purpose. Cookies may be used by servers for authenticating, tracking, and maintaining specific information about a user. Examples of uses for cookies include, allowing a server to present web sites according to site preferences set by a user, storing the contents of an electronic shopping cart between browser sessions, recognizing users who have previously visited a server, remembering user information, etc. Additionally, search sites may use cookies when presenting responses to search queries. Such cookies may be used to track and correlate search queries requested by a user.

Other types of user identifying information may also be used, such as query strings (unique identifiers added to the URLs of all links a web page contains), hidden form fields (unique identifiers added to HTML source), and client side persistence (use of javascript to store and track information on a client). Each of the above mentioned types of user identifying information may enable a server to uniquely identify a client, and track user online behavior (e.g., browsing behavior, search behavior, etc.). Thereby, a server may keep track of the types of user requests for content made, when such user requests for content are made, and so on.

At block 210, processing logic determines whether the user request for content satisfies context criteria. In one embodiment, context criteria pertain to certain characteristics of the destination server or the type of the requested content, as will be discussed in more detail below in conjunction with FIG. 4A. Alternatively, context criteria pertain to conditions under which user identifying information is received, and/or the type of the user identifying information and the user request for content, as will be discussed in more detail below in conjunction with FIG. 4B. In yet another embodiment, context criteria pertain to a combination of the factors described above. When context criteria are satisfied, the method proceeds to block 215. When the context criteria are not satisfied, the method proceeds to block 230.

At block 215, processing logic filters out user identifying information from the user request. User identifying information may be filtered out simply by removing the user identifying information from the user request for content. For example, a referrer header, cookie, query string, etc. may be removed from the user request for content. Additional steps may also be taken to filter out user identifying information, such as by using anonymous proxies.

At block 220 the filtered user request for content is sent to a destination server. Based on the filtered user request, the destination server may then send a response that includes the requested content. For example, a destination server may send web pages, search results, executable files, and so on.

At block 230, processing logic sends the user request for content to the destination server unfiltered. Based on the user request, the destination server may then send a response that includes the requested content.

Figure 3:
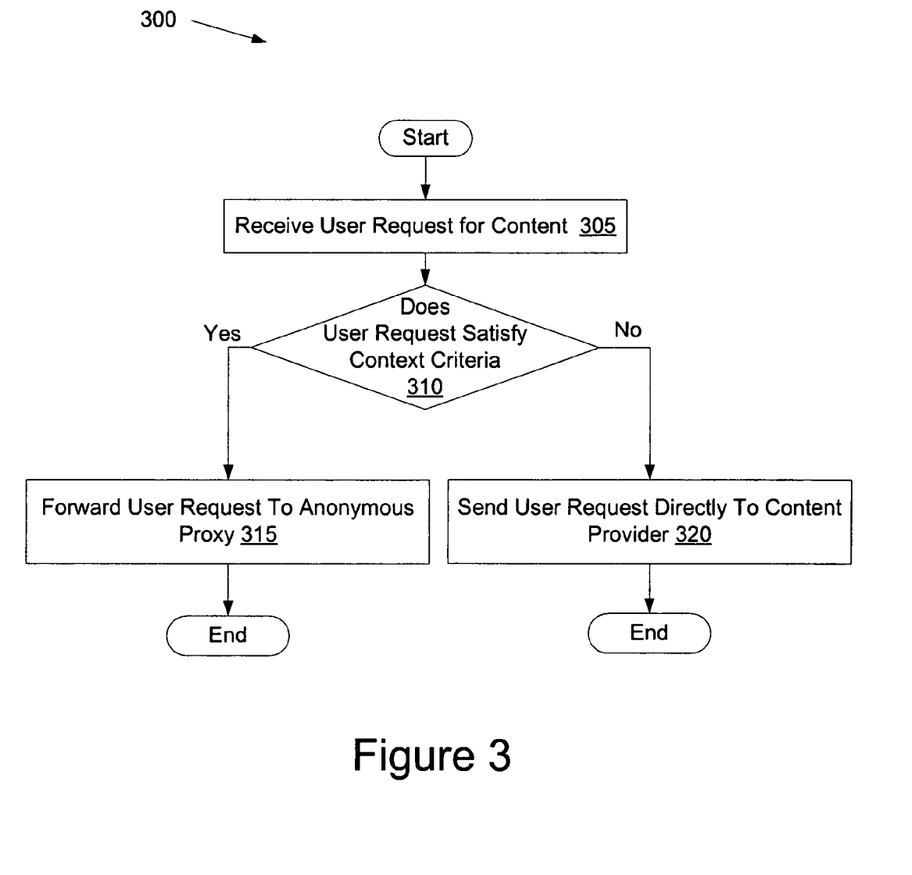
FIG. 3 illustrates a flow diagram of another embodiment for a method of filtering out user identifying information.

FIG. 3 illustrates a flow diagram of another embodiment for a method 300 of filtering out user identifying information. The method may be performed by processing logic that may comprise hardware (e.g., circuitry, dedicated logic, programmable logic, microcode, etc.), software (such as instructions run on a processing device), or a combination thereof. In one embodiment, method 300 is performed by the browser 125 of FIG. 1.

Referring to FIG. 3, method 300 begins with processing logic receiving a user request for content (block 305). The user request for content may be a request for a particular destination server to provide content. In one embodiment, a user request for content is a request to access a website. Alternatively, a user request for content may be a request for a destination server to perform a function and return a result of the function, to provide executable files, etc.

The user requests for content may include one or more types of user identifying information (e.g., IP address, referrer header, cookie, query string, hidden form field, client side persistence, etc.). Based on the user identifying information, a destination server may keep track of requests made by a specific user.

At block 310, processing logic determines whether the user request for content satisfies context criteria. In one embodiment, context criteria pertain to certain characteristics of the destination server or the type of the requested content, as will be discussed in more detail below in conjunction with FIG. 4A. Alternatively, context criteria pertain to conditions under which user identifying information is received, and/or the type of the user identifying information and the user request for content, as will be discussed in more detail below in conjunction with FIG. 4B. In yet another embodiment, context criteria pertain to a combination of the factors described above. When context criteria are satisfied, the method proceeds to block 315. When the context criteria are not satisfied, the method proceeds to block 320.

At block 315, processing logic forwards the user request for content to an anonymous proxy. In one embodiment, processing logic forwards the user request for content to an anonymous search proxy that only handles search-related requests. The anonymous proxy may be used, for example, to mask an IP address of the user, to intercept cookies, and/or to cache content from a destination server. The anonymous proxy may receive the user request for content, and send it to the destination server. Responses may then be received by the anonymous proxy from the server, and forwarded to the user. Thereby, the destination server is only informed of the IP address of the anonymous proxy.

At block 320 the user request for content is sent directly to a content provider (e.g., to a destination server).

Figure 4A:
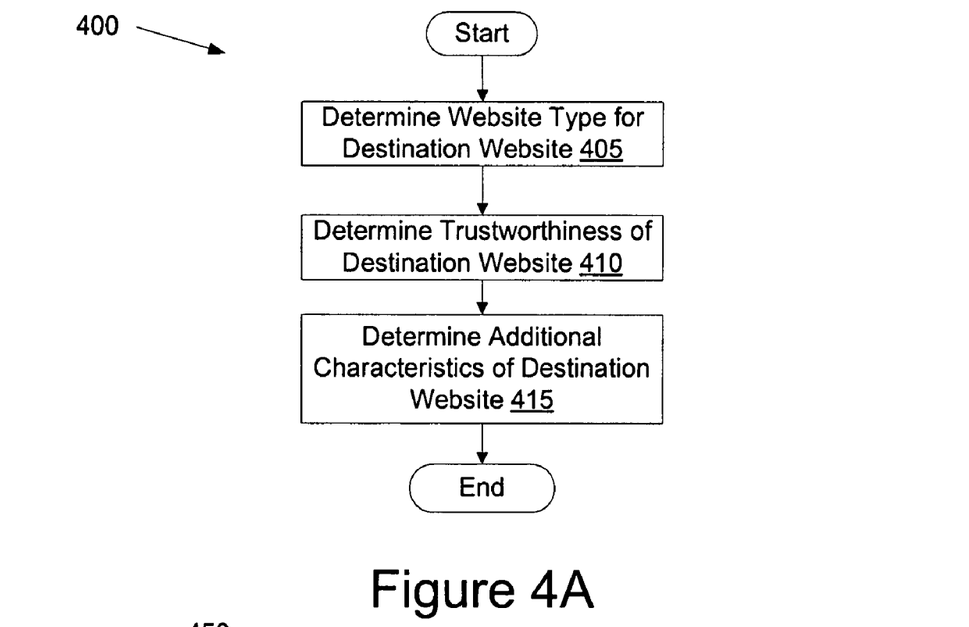
FIG. 4A illustrates a flow diagram of one embodiment for a method of determining whether context criteria are satisfied.

FIG. 4A illustrates a flow diagram of one embodiment for a method 400 of determining whether context criteria are satisfied. The method may be performed by processing logic that may comprise hardware (e.g., circuitry, dedicated logic, programmable logic, microcode, etc.), software (such as instructions run on a processing device), or a combination thereof. Method 400 may correspond to block 210 of FIG. 2 and/or block 310 of FIG. 3.

Referring to FIG. 4A, method 400 begins with processing logic determining a type of a website maintained by a destination server (block 405). Each website may be classified as belonging to one or more website types, where the classification may be based at least partially on web-content. Examples of website types include search sites, corporate websites, blog sites, commerce sites, database sites, pornography sites, etc. In one embodiment, context criteria is based on a website type. In particular, when a destination of a user request for content corresponds to a specific website type, context criteria are satisfied. When the destination of the user request for content does not correspond to a specific website type, context criteria are not satisfied. For example, the context criteria may be satisfied if the destination website of the user request for content is a search site. Alternatively, other website types (e.g., mapping website, yellow pages website, etc.) may satisfy the context criteria.

In one embodiment, the website type is predetermined. Alternatively, processing logic may rely on a third party website classification to determine the website type. In yet another embodiment, processing logic auto-detects the type of destination (e.g., if the website uses platform for privacy preferences (P3P)).

In one embodiment, context criteria include a degree of trustworthiness. In this embodiment, at block 410, processing logic determines a trustworthiness of the destination website. A degree of trustworthiness may depend on multiple factors, such as privacy policies, advertising policies (e.g., whether third party advertising is used), etc. In one embodiment, the degree of trustworthiness depends on the privacy policy of the destination server or website. For example, the destination website may have a high degree of trustworthiness if it strongly protects a user's privacy, and a low degree of trustworthiness if it releases user information to third parties. The degree of trustworthiness may also depend on whether the website is known to exploit security weaknesses of browsers, offer undisclosed advertising software, is identified as a phishing site (site that fraudulently acquires sensitive information), and so on.

In one embodiment, the trustworthiness rating is predetermined. Alternatively, processing logic may determine the trustworthiness of a website based on external trustworthiness ratings, such as those offered by McAfee's SiteAdvisor® and Microsoft® Content Ratings. In one embodiment, a user may manually set a trustworthiness rating for a destination website. Thereby, a user may upgrade or downgrade a website's trustworthiness rating based on personal experiences.

In one embodiment, context criteria include additional characteristics of the destination website. In this embodiment, at block 415, processing logic determines additional characteristics of the destination website. An example of an additional characteristic includes the physical location of the server that hosts the destination website (the physical location of a user may also be taken into consideration, even though this is not technically a characteristic of the destination website). Different locations may have different laws that govern user privacy. Where such privacy laws are more likely to permit the distribution of user information (e.g., IP addresses, search queries, etc.), context criteria may be satisfied more easily. In addition to those characteristics of the destination website and/or server mentioned above, other characteristics may also be used to set context criteria.

It should be noted that blocks 405, 410 and 415 do not all need to be performed to determine whether the context criteria are satisfied. Instead, depending on the requirements of the context criteria, processing logic may only perform one or two of the above blocks to make a determination regarding the context criteria. Alternatively, in addition to some or all of the blocks 405, 410 and 415, processing logic may also need to perform one or more blocks discussed below in conjunction with FIG. 4B. In yet another embodiment, none of the blocks of FIG. 4A are performed, and only some or all of the blocks of FIG. 4B are performed to determine whether the context criteria are satisfied.

Figure 4B:
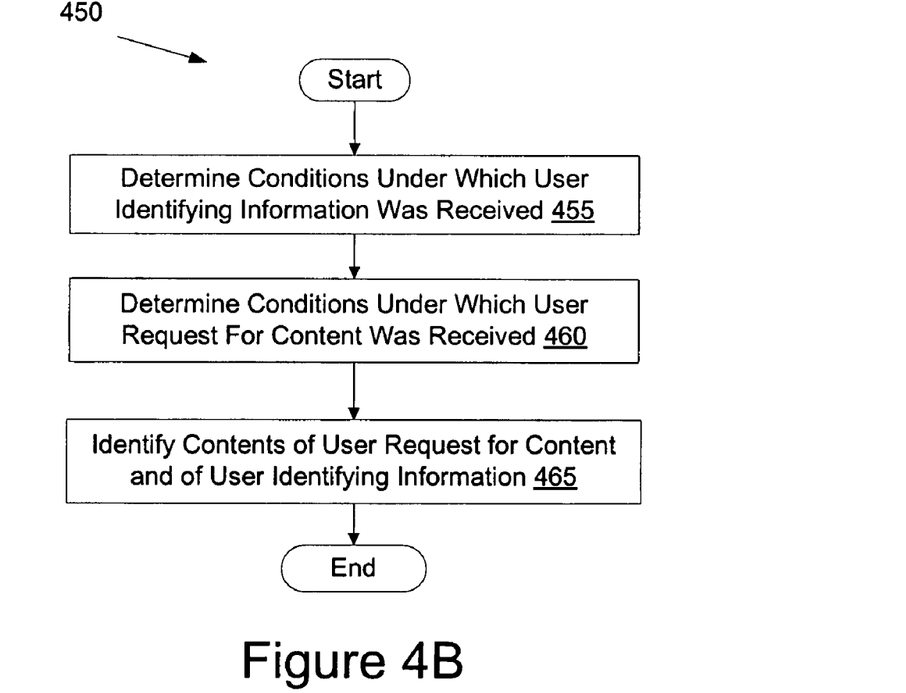
FIG. 4B illustrates a flow diagram of another embodiment for a method of determining whether context criteria are satisfied.

FIG. 4B illustrates a flow diagram of another embodiment for a method 450 of determining whether context criteria are satisfied. The method may be performed by processing logic that may comprise hardware (e.g., circuitry, dedicated logic, programmable logic, microcode, etc.), software (such as instructions run on a processing device), or a combination thereof. In one embodiment, method 450 corresponds to block 210 of FIG. 2 and/or block 310 of FIG. 3.

In one embodiment, context criteria include conditions under which user identifying information is received by the client, conditions under which a current user request for content was received, and/or the specific content of one or more of the user identifying information and the user request for content. This information may be used to determine a purpose for which the user identifying information will be used. For example, if information is received in a search box (either a search box of a website or a search box integrated into a browser), it may be determined that the user identifying information will be used to correlate a search to a user. Such a determination may cause the context criteria to be satisfied. In one embodiment, the context criteria are satisfied if data is entered into a search box. If the search box is a search box of a destination website, this information may be determined by parsing the HTML code of the destination website.

Referring to FIG. 4B, method 450 begins with processing logic determining conditions under which user identifying information was received by a client (block 455). For example, processing logic may determine that a web site has attempted to set a cookie or pixel tag.

At block 460, processing logic determines conditions under which a current user request for content was received. Conditions under which the user request for content was received may include, for example, if the request for content was received in association with a service offered by a destination website, whether the content was received to initiate a search query, whether the content was requested by an automatic redirect, etc.

At block 465, processing logic identifies the specific content of the user identifying information and of the user request for content. Content of the user request may include, for example, search terms to be used in a search query, information to be entered into a form field, and so on.

In one embodiment, the methods 400 and 450 run independently. Alternatively, the methods 400 and 450 may be combined to provide a comprehensive set of search criteria.

Figure 5:
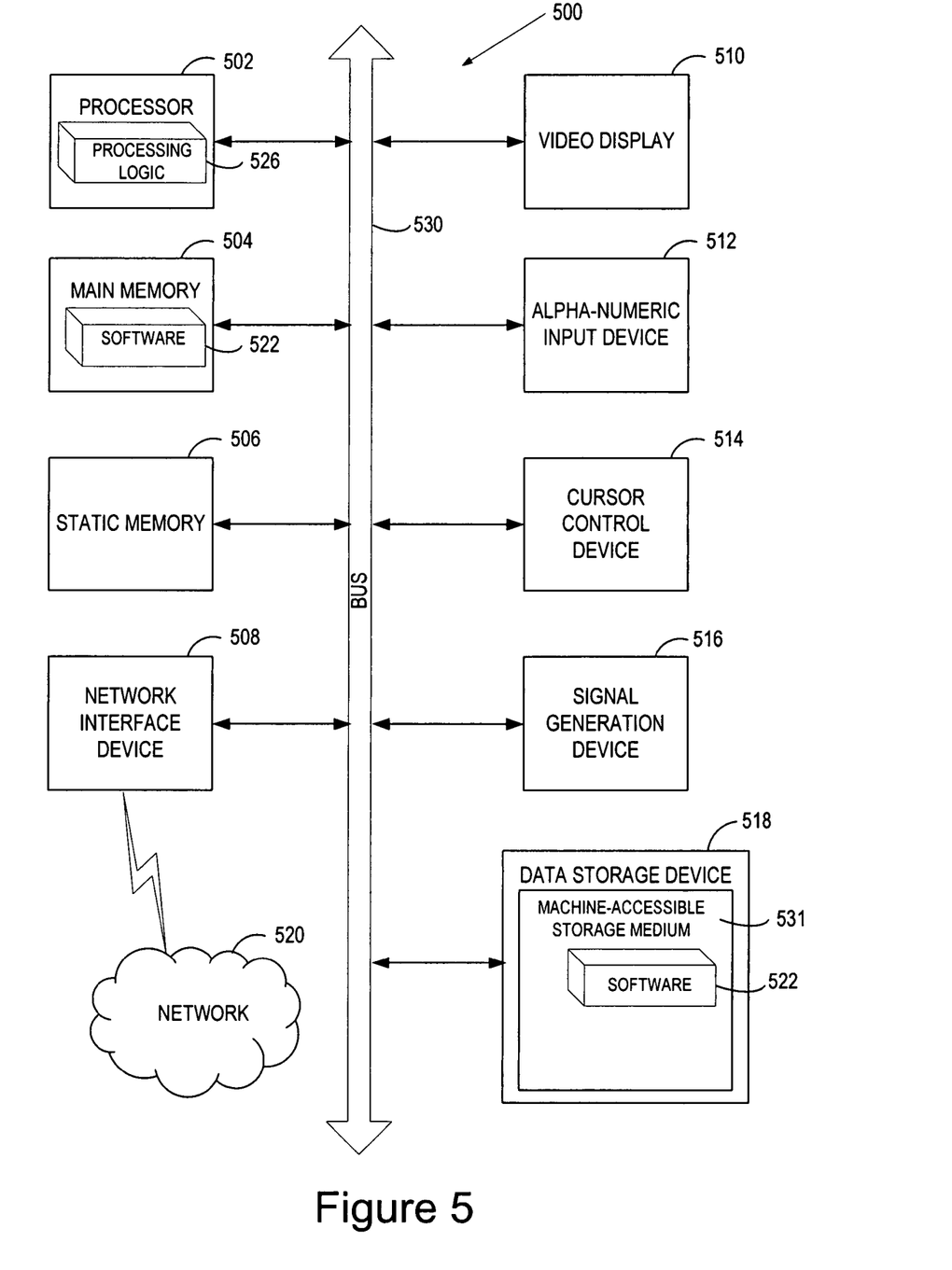
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment, the term "machine-accessible storage medium" should be taken to include a single medium or multiple media (e.g., a centralized or distributed database, and/or associated caches and servers) that store the one more sets of instructions. The term "machine-accessible storage medium" shall also be taken to include any medium that is capable of storing or encoding a sequence of instructions for execution by the machine and that cause the machine to perform any one of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a computer system programmed to perform the following, comprising:
    receiving, by a client computer system executing a browser application, a user request for content provided by a server, the user request comprising user identifying information;
    using context criteria to determine, by the browser application, whether to send the user request to a remote anonymous proxy, wherein the context criteria comprises one or more privacy laws determined based on a physical location of the server; and
    forwarding the user request to the remote anonymous proxy if the user request satisfies the context criteria, wherein the remote anonymous proxy is configured to privatize the user request by altering at least one type of user identifying information.

2. The method of claim 1, wherein the context criteria are satisfied if the content provider has specific characteristics.

3. The method of claim 2, wherein one of the specific characteristics includes a website type.

4. The method of claim 3, wherein the user request is forwarded to the anonymous proxy when the website type is a search site.

5. The method of claim 2, wherein one of the specific characteristics includes a degree of trustworthiness.

6. The method of claim 5, wherein the user request is forwarded to the anonymous proxy when a provider of the content does not have a high degree of trustworthiness.

7. The method of claim 1, wherein the context criteria are satisfied if the user request was made in association with a search function.

8. The method of claim 1, wherein the user request is forwarded to the anonymous proxy automatically without user input.

9. The method of claim 1, wherein the context criteria are satisfied if the user request was made by a user having a specific user profile or specific user preferences.

10. A non-transitory machine-accessible storage medium including data that, when accessed by a machine, cause the machine to perform a method comprising:

receiving, by a client computer system executing a browser application, a user request for content provided by a server, the user request comprising user identifying information;

using context criteria to determine, by the browser application, whether to send the user request to a remote anonymous proxy, wherein the context criteria comprises one or more privacy laws determined based on a physical location of the server; and forwarding the user request to the remote anonymous proxy if the user request satisfies the context criteria, wherein the remote anonymous proxy is configured to privatize the user request by altering at least one type of user identifying information.

11. The non-transitory machine-accessible storage medium of claim 10, wherein the context criteria are satisfied if the content provider has specific characteristics.

12. The non-transitory machine-accessible storage medium of claim 11, wherein one of the specific characteristics includes a website type.

13. The non-transitory machine-accessible storage medium of claim 12, wherein the user request is forwarded to the anonymous proxy when the website type is a search site.

14. The non-transitory machine-accessible storage medium of claim 11, wherein one of the specific characteristics includes a degree of trustworthiness.

15. The non-transitory machine-accessible storage medium of claim 14, wherein the user request is forwarded to the anonymous proxy when a provider of the content does not have a high degree of trustworthiness.

16. The non-transitory machine-accessible storage medium of claim 10, wherein the context criteria are satisfied if the user request was made in association with a search function.

17. The non-transitory machine-accessible storage medium of claim 10, wherein the user request is forwarded to the anonymous proxy automatically without user input.

18. An apparatus, comprising:

a memory to store instructions for a browser application; and a processor, connected to the memory, to execute the instructions, wherein the instructions cause the processor to:

determine whether to send a user request to a remote anonymous proxy based on context criteria, wherein the determining is done by the browser application, and wherein the context criteria comprises one or more privacy laws determined based on a physical location of a content provider server; and forward the user request to the remote anonymous proxy if the user request satisfies the context criteria, wherein the remote anonymous proxy is configured to privatize the user request by altering at least one type of user identifying information.

19. The apparatus of claim 18, wherein the context criteria are satisfied if the content provider has specific characteristics.

20. The apparatus of claim 19, wherein the context criteria are satisfied if the content provider is a search site.

21. The apparatus of claim 18, wherein the context criteria are satisfied if the user request was made in association with a search function.

* * * * *